United States Patent Office 3,105,147
Patented Sept. 24, 1963

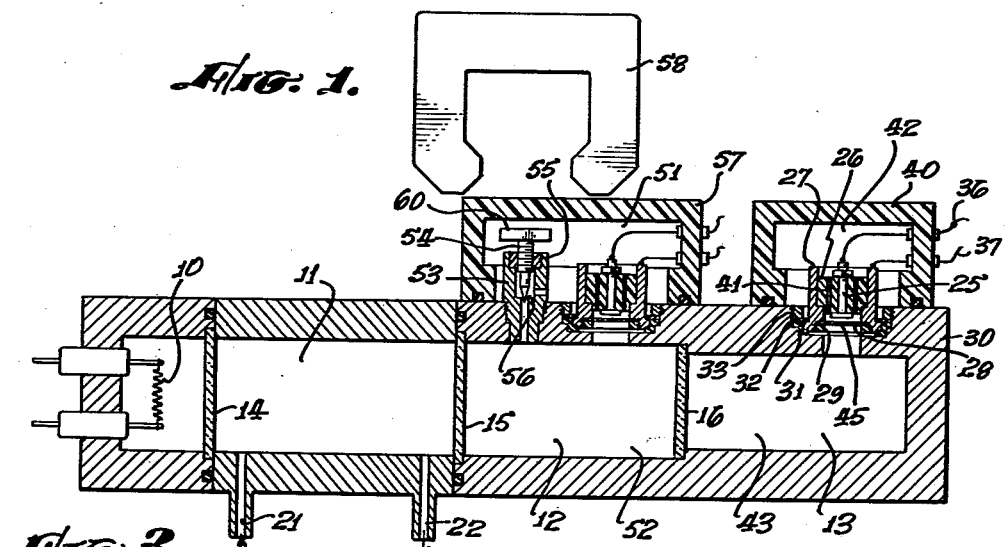
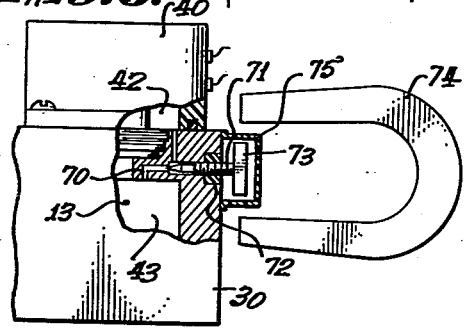
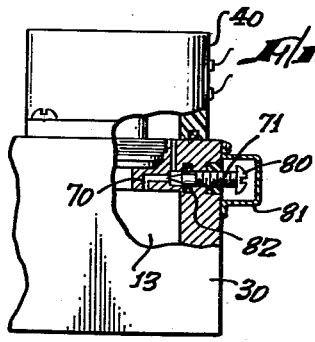
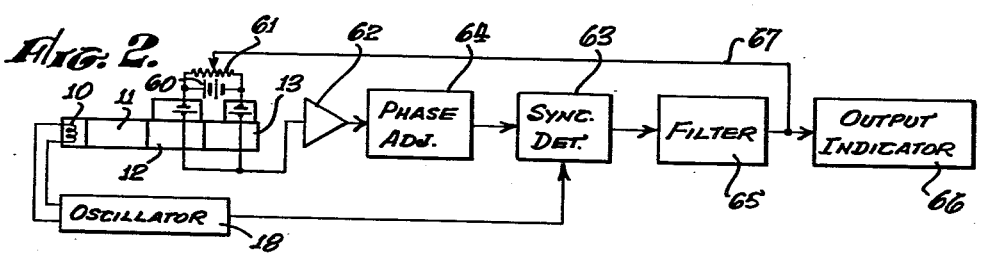
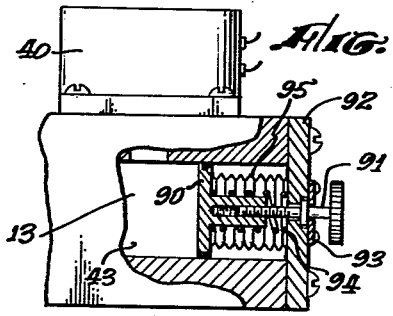
AUGUST O. WEILBACH,
CEDRIC H. BEEBE,
INVENTORS.
BY THEIR ATTORNEYS
HARRIS, KIECH, RUSSELL & KERN.

3,105,147
MONOBEAM INFRARED GAS ANALYZER WITH MEANS TO CONTROL THE PHASE DIFFERENCE BETWEEN THE TWO CELLS
August O. Weilbach, La Habra, and Cedric H. Beebe, Fullerton, Calif., assignors to Beckman Instruments, Inc., a corporation of California
Filed Apr. 3, 1961, Ser. No. 100,056
6 Claims. (Cl. 250—43.5)

This invention relates to analyzers of the optical type and, in particular, to positive type infrared analyzers.

In general, such an analyzer includes a source of radiation, a sample cell and two detector cells, with the radiation being cyclical in nature and directed through the cells. Each of the detector cells includes a variable capacitor actuated by dynamic pressure changes within the cell, with the capacitors being coupled into an electrical circuit to provide an output indicative of the composition of the sample. Instruments of this general type are well known. See for example, U.S. Patent to Liston, No. 2,924,713, and the copending application of Liston and Madsen, Serial No. 13,932, filed March 9, 1960, and assigned to the same assignee as the present application. The present invention will be described herein as used with the instrument of the aforesaid application of Liston et al., but it is understood that the invention is not limited to this specific application.

A typical monobeam infrared gas analyzer includes two detector cells positioned optically in series, with each cell containing a variable capacitor. One plate of the capacitor is fixed in the cell and the other plate comprises a movable diaphragm which separates the cell into two zones. The diaphragm will have an opening therethrough to provide static balance of pressure in the two zones, but the diaphragm will move in response to dynamic pressure changes. The required sensitivity for analysis for a particular gas is achieved by sealing a low pressure of the gas in the first cell. The second cell is generally charged with a higher pressure of the same gas to provide approximately the same signal output as the first cell and minimize the effects of interfering absorption of other gases in the analysis mixture.

Infrared radiation, pulsed or interrupted at a relatively low frequency, such as at two cycles per second, passes through a sample cell through which the gas mixture to be analyzed is flowing, and then into the first and second detector cells. Absorption of infrared energy within the detector cells of wavelengths at which the sensitizing gas has absorption bands produces alternate heating and cooling of the gas within the detector cells. The resulting pressure pulsations cause motion of the diaphragms with respect to the fixed capacitor plates. The capacitance changes result in generation of output voltages which are combined and amplified. One polarity of bias voltage is applied across the capacitor of the first cell and the opposite polarity across the capacitor of the second cell, so that when the background or nonabsorbing gas is in the sample cell, the ratio of bias voltages applied to the capacitors may be adjusted to provide a minimum net output signal. The introduction of any of the gas into the sample cell for which the detector is sensitized results in a reduction of the energy in the wavelengths to which the first detector cell responds and thus produces an increase in net output signal voltage.

Various forms of electrical circuitry have been used in conjunction with the capacitors of the detector cells, including phase detection systems and amplitude detection systems, both of which are described in detail in the aforesaid copending application of Liston et al. In general, amplitude detection systems are simpler in design and less troublesome to operate than phase detection systems. However, in order to obtain high sensitivity in an infrared analyzer with an amplitude detection system, it is necessary that the phase difference in the signals from the capacitors be substantially zero.

The phase difference between the moving diaphragms of two cells is dependent upon the gas charges in the cells, the physical dimensions of the cells, and the openings in the diaphragms. These factors are difficult to control in the manufacture of analyzers, particularly the latter item. In a typical high sensitivity analyzer the moving diaphragms of the capacitors will be formed of gold foil in the order of 0.00005 inch thick. It can be appreciated that the problems encountered in making a precision opening in such material are extremely difficult, particularly when coupled with the fact that foils of this size are relatively porous because of minute holes present therein. With the best controls of dimensions possible, the phase differences between the two detector cells in batches of identical analyzers have a variation of plus and minus thirty degrees. In order to operate properly with an amplitude detection system, this phase difference should not exceed one degree.

Accordingly, it is an object of the present invention to provide a new and improved infrared analyzer of high sensitivity and incorporating an amplitude detection system. A further object is to provide such an instrument in which the phase difference in diaphragm motions can be made less than one degree. Another object is to provide a method of making such an instrument in which the phasing of the moving diaphragms can be adjusted to a minimum of less than one degree.

It is a particular object of the invention to provide an infrared analyzer having first and second detector cells disposed for radiation from an energy source, with each of the cells having two zones separated by a movable diaphragm, and including means for changing the pressure of the gas in one of the cells and thereby the relative phase of the motions of the diaphragms. A further object is to provide such an instrument including means for varying the volume of one of the zones of one of the cells. A further object is to provide such an instrument including means for varying the gas flow impedance in a passage interconnecting the two zones of one of the cells.

It is an object of the invention to provide an analyzer including means for varying the phasing of the moving diaphragms which means can be operated after the analyzer has been assembled and sealed to provide individual adjustment for each analyzer. A further object is to provide such an instrument in which the adjustment means is sealed within the analyzer, while being operable from the exterior of the analyzer.

A specific object of the invention is to provide a phase control system for a monobeam analyzer having a gas flow passage between the zones of one of the detector cells, and means for varying the gas flow impedance of the passage. A further object is to provide such an instrument including a bypass passage around the diaphragm and a needle valve positioned in the passage for varying the size thereof. A specific object is to provide such an instrument in which the needle valve includes a portion of magnetic material which is operable by an externally positioned magnet.

It is a specific object of the invention to provide a method of making an infrared analyzer including the steps of assembling and sealing the sample and detector cells, cyclically energizing the cells, noting the phase difference of the two diaphragms, and adjusting the size of the flow path between the two zones of one cell to reduce the phase difference to a minimum.

The invention also comprises novel details of construction and novel combinations and arrangements of parts, which will more fully appear in the course of the following description. The drawing merely shows and the description merely describes preferred embodiments of the present invention which are given by way of illustration or example.

In the drawing:

FIG. 1 is a sectional view of a preferred embodiment of the invention;

FIG. 2 is a block diagram of the instrument of FIG. 1; and

FIGS. 3, 4 and 5 are partial sectional views showing alternative forms of the invention of FIG. 1.

The analyzer of FIG. 1 includes a radiant energy source 10, a sample cell 11, and detector cells 12, 13. The cells are arranged in optical series relation and are separated by windows 14, 15, 16 of quartz or other material having suitable transmission characteristics.

The source 10 may be a conventional coil of resistance wire energized from a power source, such as an oscillator 18 (FIG. 2). The oscillator is preferably a multivibrator or square wave generator providing pulsed energy and substantially one hundred per cent modulation to the source. Of course, other conventional means of providing a cyclically varying beam of radiation may be utilized, a mechanically driven chopper or shutter being typical.

The sample cell has an inlet 21 and an outlet 22 providing for continuous flow of sample therethrough, permitting continuous monitoring of process streams and the like. Of course, the instrument may also be used for batch measurements.

Each of the detector cells 12, 13 includes a variable capacitor for generating a voltage signal as a function of energy changes occurring within the cell. The capacitors are identical in construction and only one will be described in detail. Referring to the cell 13, the capacitor includes a fixed electrode 25 supported in an insulator 26 which in turn is carried in a sleeve 27. The other electrode is the moving electrode and typically is a diaphragm 28 of metal foil. In the preferred form of the instrument, the diaphragm is gold foil in the order of 0.00005 inch thick. The diaphragm is clamped in the sleeve 27 by a nut 29. The sleeve is mounted in a counterbore in the analyzer housing 30 on an insulating ring 31 and is held in place with an insulating washer 32 and nut 33. An electrical conductor 36 is connected to the fixed electrode 25 and another conductor 37 is connected to the diaphragm electrode 28 through the sleeve 27.

A cap 40 is fastened to the housing 30 and encloses the capacitor structure. A plurality of openings 41 in the insulator 26 permit free flow of gas between the upper surface of the diaphragm 28 and the interior of the cap 40. The diaphragm itself divides the detector cell 13 into zones 42, 43. A very small bypass opening is provided for interconnecting the two zones 42, 43 of the cell. Normally this bypass passage is made in the form of a small opening 45 in the diaphragm. Alternatively, the bypass opening could be through a wall of the housing 30 or a diaphragm of suitable porosity could be utilized. This bypass passage provides for static pressure equalization between the two zones of the cell.

The diaphragm of the capacitor in the detector cell 12 divides the cell into zones 51, 52. A gas flow passage having a controllable flow impedance is provided for interconnecting the two zones. In the preferred form of FIG. 1, a plug 53 is threadedly inserted into the wall of the analyzer housing 30 to provide a bypass passage around the capacitor structure. A shaft 54 is threadedly engaged in a resilient insert 55 carried in the plug 53. The shaft has a tapered end for engaging a valve seat 56 of the plug to function as a needle valve. The insert 55 is preferably of a durable and resilient material such as nylon or Teflon which provides a friction grip on the shaft 54 to maintain the shaft fixed in the presence of vibration and shock but permitting rotation of the shaft on application of adequate torque. This entire bypass structure is sealed within the detector cell by the cap 57 which also encloses the capacitor structure of the cell. Means are provided for adjusting the flow impedance of the bypass passage from the exterior of the cell after the cell has been charged and sealed. The member 54 includes a portion of magnetic material, such as a transversely disposed bar 60 of soft iron. Then the needle valve may be rotated by positioning a strong magnet 58 over the bar, as shown in FIG. 1, and rotating the magnet producing synchronous rotation of the needle valve. An opening is not required in the diaphragm of the cell having the bypass passage but may be used if desired.

An amplitude detection system for use with the analyzer is shown in the block diagram of FIG. 2. This circuit is shown in detail in the aforesaid copending application of Liston et al. and hence is not repeated herein. A D.C. voltage source 60 is connected across the fixed electrodes of the two capacitors. A potentiometer 61 is connected across the voltage source to provide adjustment of the bias voltage ratio. The moving electrodes or diaphragms of the two capacitors are connected together at the input of an amplifier 62. The amplifier output is connected to a synchronous detector 63 through a phase adjustment circuit 64. It should be noted that the phase adjustment circuit 64 provides for adjustment of the phase of the combined signals from the two capacitors for use in the synchronous detector. This phase adjustment circuit does not affect the relative phase of the two signals from the two capacitors. The phase adjustment circuit 64 is conventional in nature, while it is an object of the present invention to provide means for controlling the relative phasing of the signals from the two capacitors. The oscillator 18 provides the reference signal for the synchronous detector. The D.C. output from the detector passes through a filter 65 to an output indicator 66, which ordinarily is a recorder of some type. The filtered D.C. output is also fed back to the arm of the potentiometer 61 through line 67 to shift the ratio of the bias voltages and tend to rebalance the system.

The analyzer is assembled and charged in the usual manner. Then the instrument is operated with a reference gas in the sample cell and the potentiometer 61 is adjusted to provide a minimum output signal. Then a phase shifting network is connected in circuit with one of the capacitors ahead of the point where the signals from the two capacitors are combined. The phase shift network is adjusted to bring the output signal to a minimum. The amount of phase shift introduced by the phase shift network indicates the phase difference between the two capacitors. Then the needle valve of the cell 12 is rotated by use of the magnet 58 to change the flow impedance of the bypass passage. Then the measurement of the phase difference is repeated. Successive adjustments of the needle valve are made until the phase difference is reduced to less than one degree. Then the phase shift network is removed and the instrument is ready for use in the conventional manner.

The present invention permits the manufacture in quantity of instruments having uniform performance characteristics and high sensitivity. In particular, it should be noted that the invention permits the manufacture of instruments with substantially zero phase differences so that amplitude detection systems can be used with the inherent simplicity and sensitivity thereof. The large and unpredictable phase differences in otherwise uniform capacitor structures can be reduced without affecting the gas charge of the cells and hence without affecting the detecting characteristics of the cells. Also, there is no problem with leakage before, during, or after the adjustment.

An alternative construction for the bypass passage is shown in FIG. 3. A Z-shaped passage 70 is provided in the wall of the housing 30 interconnecting the zones 42, 43 of the cell 13. A threaded shaft 71 is mounted in an insert 72 carried in the housing wall, with the shaft having a needle valve for engaging a valve seat in the passage 70. A transverse soft iron bar 73 is carried by the member 71 and projects outward from the housing 30 for actuation by a magnet 74. The projecting portion of the needle valve is enclosed in a cap 75 mounted on the housing 30 in sealing relation. The structure of FIG. 3 is particularly suited for use where the main housing and the capacitor caps are to be made of a magnetic material, which would adversely affect the magnetic coupling. Then the cap 75 can be of nonmagnetic material, such as brass or aluminum providing ease of operation with the magnet 74.

Another alternative form is shown in FIG. 4 wherein the needle valve is directly operated by a screw driver or the like. The needle valve has a slotted head 80 and a cap 81 is removably carried on the housing to prevent unintentional rotation of the valve member. A seal in the form of an O-ring 82 is provided in the wall of the housing engaging a smooth section of the member 71.

Another alternative structure for controlling the pressure in a detector cell and hence the phase difference in the motions of the capacitor diaphragms is shown in FIG. 5. A piston 90 is slidably positioned in the zone 43 of the cell 13. An adjustment screw 91 is mounted in an end plate 92 of the housing for rotation relative to the housing, the screw being held in place by a plate 93. The screw 91 has a threaded portion which engages a threaded portion of the piston 90 for moving the piston in the cell. A spring 94 may be positioned between the piston and the end plate 92 to eliminate undesired movement of the piston. A bellows 95 may be fixed at one end to the piston and at the other end to the end plate to provide a seal for the detector cell.

Rotation of the shaft 91 moves the piston in the cell to change the volume of the cell and hence the gas pressure therein. The analyzer is adjusted in the same manner as described in conjunction with the embodiment of FIG. 1, with the piston being moved after each phase difference measurement until the desired minimum phase difference is achieved.

It should be noted that the phase adjustment may be made in conjunction with either cell or could be used with both cells if desired. Other applications of the invention are possible and the embodiments disclosed may be subjected to various changes, modifications and substitutions without necessarily departing from the spirit of the invention.

We claim as our invention:

1. A phase control system for a monobeam analyzer having a sample cell and two detector cells arranged in optical series, with each of the detector cells having two zones separated by a movable diaphragm, comprising:
means defining a gas flow passage between the zones of one of said detector cells;
and means for varying the gas flow impedance of said passage and thereby the relative phase of the motions of said diaphragms.

2. In an infrared analyzer, the combination of:
first and second detector cells disposed for radiation from an energy source, each of said cells having two zones separated by a movable diaphragm;
means defining a gas flow passage between the zones of one of said cells, with said flow passage bypassing the diaphragm of said one cell and with said passage remaining open during operation of the analyzer;
and means for varying the gas flow impedance of said flow passage and thereby the relative phase of the motions of said diaphragms.

3. In an infrared analyzer, the combination of:
first and second detector cells disposed for radiation from an energy source, each of said cells having two zones separated by a movable diaphragm;
first means defining a first gas flow passage between the zones of one of said cells, with said first flow passage bypassing the diaphragm of said one cell and remaining open during operation of the analyzer;
second means defining a second gas flow passage between the zones of the other of said cells, with said second passage remaining open during operation of the analyzer;
and means for varying the gas flow impedance in said first passage.

4. In an infrared analyzer, the combination of:
first and second detector cells disposed for radiation from an energy source, each of said cells having two zones separated by a movable diaphragm;
means defining a flow passage between the two zones of each of said cells;
a plunger slidingly engaging the inner wall of one of said cells;
a shaft positioned in the wall of said one cell and engaging said plunger for movement thereof relative to said one cell; and
a flexible wall member sealed to said plunger and cell wall for isolating said shaft from the interior of said one cell, with movement of said shaft relative to said wall providing for varying the volume of one of the zones of said one cell.

5. In an infrared analyzer, the combination of:
first and second detector cells disposed for radiation from an energy source, each of said cells having two zones separated by a movable diaphragm;
means defining a flow passage between the two zones of each of said cells;
a plunger slidingly engaging the inner wall of one of said cells in sealing relation; and
a shaft positioned in the wall of said one cell and engaging said plunger for movement thereof relative to said one cell for varying the volume of one of the zones of said one cell.

6. A method of calibrating an infrared analyzer: having two sealed cells, with each cell having a diaphragm dividing the cell into two zones and a passage interconnecting the zones of the cell, and with each cell having a charge of gas therein; including the steps of:
directing a cyclically varying radiation beam into the cells to cyclically move the diaphragms;
measuring the difference in phase of the motions of the two diaphragms;
and varying the size of one of the passages to reduce the phase difference to a minimum.

References Cited in the file of this patent

UNITED STATES PATENTS

| | | |
|---|---|---|
| 2,289,574 | Carlson | July 14, 1942 |
| 2,767,321 | Woodhull | Oct. 16, 1956 |
| 2,924,713 | Liston | Feb. 9, 1960 |

FOREIGN PATENTS

| | | |
|---|---|---|
| 727,600 | Great Britain | Apr. 6, 1955 |